(12) United States Patent
Toko et al.

(10) Patent No.: US 10,781,992 B2
(45) Date of Patent: Sep. 22, 2020

(54) VEHICLE HEADLAMP SYSTEM

(71) Applicant: STANLEY ELECTRIC CO., LTD., Meguro-ku, Tokyo (JP)

(72) Inventors: Yasuo Toko, Tokyo (JP); Tomohide Mano, Tokyo (JP); Hiroshi Tozuka, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 119 days.

(21) Appl. No.: 16/057,184

(22) Filed: Aug. 7, 2018

(65) Prior Publication Data

US 2019/0063712 A1    Feb. 28, 2019

(30) Foreign Application Priority Data

Aug. 24, 2017 (JP) .................................. 2017-161224

(51) Int. Cl.
*F21S 41/60* (2018.01)
*G02F 1/1343* (2006.01)
(Continued)

(52) U.S. Cl.
CPC ............. *F21S 41/60* (2018.01); *F21S 41/135* (2018.01); *F21S 41/147* (2018.01); *F21S 41/25* (2018.01);
(Continued)

(58) Field of Classification Search
CPC .. G02F 1/134309; F21S 41/645; H01J 61/125
See application file for complete search history.

(56) References Cited

U.S. PATENT DOCUMENTS 6,937,380 B2    8/2005    Fanton et al.
6,995,892 B2    2/2006    Fanton et al.
(Continued)

FOREIGN PATENT DOCUMENTS

DE    102010047376 A1    4/2012
DE    102013020549 A1    6/2015
(Continued)

OTHER PUBLICATIONS

Extended European Search Report (EESR) dated Nov. 7, 2018 issued in counterpart European Application No. 18190515.9.

*Primary Examiner* — Lucy P Chien
(74) *Attorney, Agent, or Firm* — Holtz, Holtz & Volek PC

(57) ABSTRACT

To facilitate lead wiring layout corresponding to an increase in the number of individual electrodes of the liquid crystal element in a vehicle headlamp system. The vehicle headlamp system that selectively performs light irradiation towards the periphery of its own vehicle includes a light source, a liquid crystal element, and a lens. The liquid crystal element includes a plurality of first individual electrode parts, a plurality of second individual electrode parts, and a first lead wiring part. The first lead wiring part includes a plurality of first individual wirings each of which is connected to one of the plurality of first individual electrode parts, and a plurality of second individual wirings each of which is connected to one of the plurality of second individual electrode parts and arranged through a gap formed between the adjacent first individual electrode parts in the first direction.

10 Claims, 7 Drawing Sheets

(51) Int. Cl.
  *F21S 41/25* (2018.01)
  *F21S 41/64* (2018.01)
  *F21S 41/43* (2018.01)
  *G02F 1/1345* (2006.01)
  *F21S 41/135* (2018.01)
  *F21S 41/255* (2018.01)
  *F21S 41/147* (2018.01)
  *F21Y 115/10* (2016.01)
  *F21S 41/141* (2018.01)
  *F21W 102/145* (2018.01)

(52) U.S. Cl.
  CPC ............ *F21S 41/255* (2018.01); *F21S 41/43* (2018.01); *F21S 41/645* (2018.01); *G02F 1/1345* (2013.01); *G02F 1/134309* (2013.01); *G02F 1/134327* (2013.01); *F21S 41/141* (2018.01); *F21W 2102/145* (2018.01); *F21Y 2115/10* (2016.08); *G02F 2201/122* (2013.01)

(56) References Cited

U.S. PATENT DOCUMENTS

| | | | |
|---|---|---|---|
| 8,721,146 | B2 | 5/2014 | Kathmann et al. |
| 9,666,756 | B2 | 5/2017 | Von et al. |
| 2004/0100676 | A1 | 5/2004 | Fanton et al. |
| 2005/0168794 | A1 | 8/2005 | Fanton et al. |
| 2007/0236640 | A1* | 10/2007 | Kimura ............ G02F 1/134363 349/141 |
| 2012/0170300 | A1 | 7/2012 | Kathmann et al. |
| 2014/0098556 | A1 | 4/2014 | Von et al. |
| 2016/0077402 | A1* | 3/2016 | Takehara ................ G02F 1/29 349/33 |
| 2017/0083160 | A1* | 3/2017 | Hashida ................ G06F 3/0412 |
| 2018/0190723 | A1* | 7/2018 | Han ...................... H01L 27/323 |

FOREIGN PATENT DOCUMENTS

| | | |
|---|---|---|
| JP | 2005183327 A | 7/2005 |
| JP | 2011124110 A | 6/2011 |
| JP | 2012069458 A | 4/2012 |
| WO | 2012156121 A1 | 11/2012 |

\* cited by examiner

VEHICLE HEADLAMP SYSTEM

BACKGROUND OF THE INVENTION

Field of the Invention

The present invention relates to a technique for selectively irradiating the periphery of a vehicle using a liquid crystal element.

Description of the Background Art

Prior art vehicle headlamp that performs light distribution control using a liquid crystal element is disclosed, for example, in Japanese Unexamined Patent Application Publication No. 2005-183327 and Japanese Unexamined Patent Application Publication No. 2011-124110. In these prior arts, it is possible to form a desired light distribution pattern by selectively transmitting light from a light source by using a liquid crystal element. For instance, such a light distribution pattern is used for controlling light distribution in which a high beam is not irradiated to areas where other vehicles (preceding vehicles, oncoming vehicles, etc.) and pedestrians exist in the periphery of its own vehicle while a high beam is irradiated to other areas.

Here, when forming the light distribution pattern by selectively irradiating light as described above, it is desirable to increase the number of light modulation regions that can individually control the transmission and non-transmission of light and to increase the resolution.

On the other hand, from the viewpoint of achieving high quality light distribution pattern and increase in pattern switching speed, for example, it is preferable to use a static driving method or a low duty multiplex driving method to control the liquid crystal element. Thus, a liquid crystal element with high-speed responsiveness and with high contrast is realized.

However, in order to increase the number of light modulating regions of the liquid crystal element, it is necessary to increase the number of individual electrodes capable of independently applying voltage, and accordingly, the number of lead wirings for supplying voltage to each individual electrode is also increased. Thus, the layout design of each lead wiring becomes difficult.

In a specific aspect, it is an object of the present invention to provide a technique to facilitate the lead wiring layout corresponding to an increase in the number of the individual electrodes of the liquid crystal element used for the vehicle headlamp.

SUMMARY OF THE INVENTION

A vehicle headlamp system according to one aspect of the present invention is a vehicle headlamp system that selectively performs light irradiation towards the periphery of its own vehicle including (a1) a light source, (a2) a liquid crystal element arranged at a position where light from the light source enters, and (a3) a lens for projecting an image formed by the light emitted from the liquid crystal element to the periphery of its own vehicle, wherein (b) the liquid crystal element includes, (b1) a first substrate and a second substrate arranged to face each other, (b2) a liquid crystal layer disposed between the first substrate and the second substrate, (b3) a first electrode and a first lead wiring part provided onto the first substrate, and (b4) a second electrode disposed onto the second substrate arranged to face the first electrode, wherein (c) the first electrode includes (c1) a first electrode pattern part having a plurality of first individual electrode parts arrayed along a first direction in a plan view, (c2) a second electrode pattern part having a plurality of second individual electrode parts arrayed along the first direction in a plan view and disposed adjacent to the first electrode pattern part in a second direction which is substantially orthogonal to the first direction, wherein (d) the first lead wiring part includes (d1) a plurality of first individual lead wirings each of which is connected to one of the plurality of first individual electrode parts, and (d2) a plurality of second individual lead wirings each of which is connected to one of the plurality of second individual electrode parts and arranged through a gap formed between the adjacent first individual electrode parts in the first direction.

According to the above configuration, when selectively irradiating the periphery of its own vehicle with a liquid crystal element, it is possible to facilitate the lead wiring layout corresponding to an increase in the number of the individual electrodes of the liquid crystal element.

DESCRIPTION OF THE PREFERRED EMBODIMENTS

Figure 1:
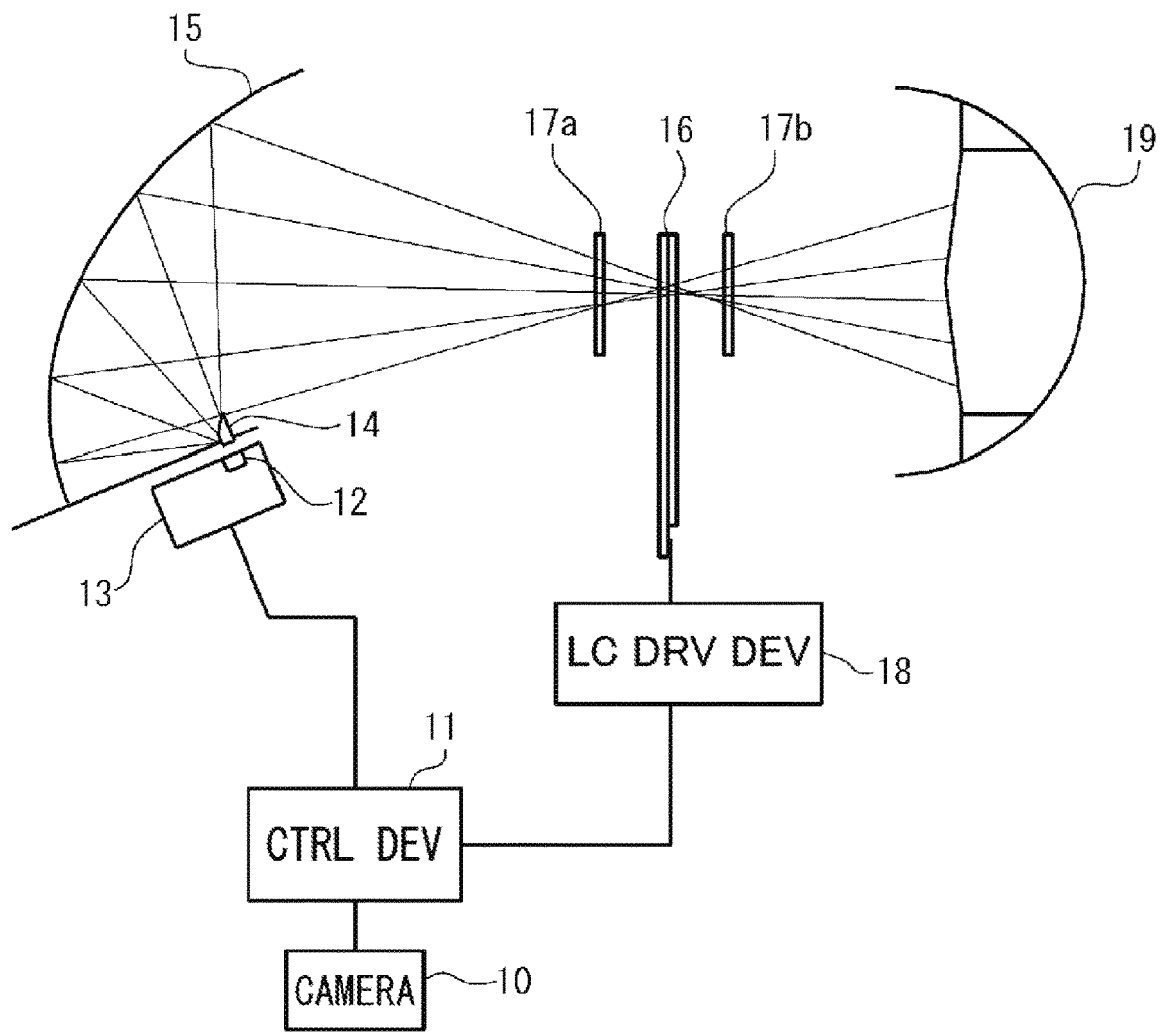
FIG. 1 is a figure showing a configuration of a vehicle headlamp system according to one embodiment.

FIG. 1 is a figure showing a configuration of a vehicle headlamp system according to one embodiment. The vehicle headlamp system shown in the figure is configured to selectively irradiate the front of its own vehicle and provide a desired light distribution pattern. The system is configured to include a camera 10, a control device 11 (abbreviated as CTRL DEV in FIG. 1), a light emitting element 12, a light emitting element driving device 13, a separator 14, a reflector 15, a liquid crystal element 16, a pair of polarizers 17a and 17b, a liquid crystal driving device 18 (abbreviated as LC DRV DEV in FIG. 1), and a lens 19. This vehicle headlamp system selectively irradiates light according to the situation of other vehicles (preceding vehicles, oncoming vehicles) and the like that exist in front of its own vehicle.

The camera 10 is for photographing the front of its own vehicle, and is installed at a predetermined position (for example, the upper portion of the front windshield) in the vehicle.

The control device 11 is for controlling the overall operation of the vehicle headlamp system, and is configured of a computer system including a CPU, a ROM, a RAM or the like, for example. The control device 11 detects the position of other vehicles or the like by performing a predetermined image processing based on the image ahead of its own vehicle photographed by the camera 10. Then, the control device 11 determines the non-irradiation area which is the predetermined area including the area where other vehicles exist within the high beam area and the light irradiation area which is the area other than the non-irradiation area, and controls the liquid crystal driving device 18 for desired light irradiation.

Further, based on the steering angle information indicating the steering angle of the steering wheel obtained from a sensor (not shown in the figure) provided in its own vehicle, the control device 11 variably sets the position of the high beam cutoff line in the left-right direction (horizontal direction) according to the steering angle of the steering wheel and controls the liquid crystal driving device 18 for desired light irradiation.

The light emitting element 12 is a semiconductor light emitting element such as an LED, for example, and is driven by the light emitting element driving device 13 to emit light. As for the light emitting element 12, an LED which emits white light is used, for example.

The light emitting element driving device 13 supplies driving power to the light emitting element 12 when the control device 11 detects that the light switch signal (H/L) is turned on and provides a lighting control signal to the driving device.

The separator 14 and the reflector 15 constitute an optical system for converging the light emitted from the light emitting element 12 to a predetermined position of the liquid crystal element 16. Here, the separator 14 is not essential and may be omitted. Further, as for the optical system, an optical system other than the reflection-type projection optical system exemplified here, a lens optical system for example, may be used.

Here, in the present embodiment, a "light source" is configured to include the light emitting element 12, the light emitting element driving device 13, the separator 14 and the reflector 15.

The liquid crystal element 16 is disposed between a pair of polarizers 17a and 17b, and together with these polarizers 17a and 17b, partially transmits or blocks the incident light.

A pair of polarizers 17a and 17b are for passing components polarized in a specific direction of the incident light. In the present embodiment, as for each of the polarizers 17a and 17b, a wire grid polarizer is used, for example. The term "wire grid polarizer" used here is defined as a thin metal wire made of aluminum, etc. provided on an inorganic transparent substrate made of glass, quartz, sapphire or the like to achieve a polarizing function.

Here, a polarization conversion element that converts all components of incident light into linearly polarized light in a specific direction may be used for each of the polarizers 17a and 17b. Further, as for each of the polarizers 17a, 17b, a recycling type optical system may be configured by using a reflective polarizer. According to these systems, light utilization efficiency can be further enhanced.

The liquid crystal driving device 18 individually controls the light transmission state (light transmission and light shielding) in each of the plurality of light modulation regions provided in the liquid crystal element 16 by driving the liquid crystal element 16 based on the control signal from the control device 11.

The lens 19 projects the image formed by the light transmitted through the liquid crystal element 16 to the front of its own vehicle. As for the lens 19, an inverted projection type projector lens having a specific focal distance is used, for example. In this case, the liquid crystal element 16 described above is arranged near the focal point of the lens 19.

Figure 2:
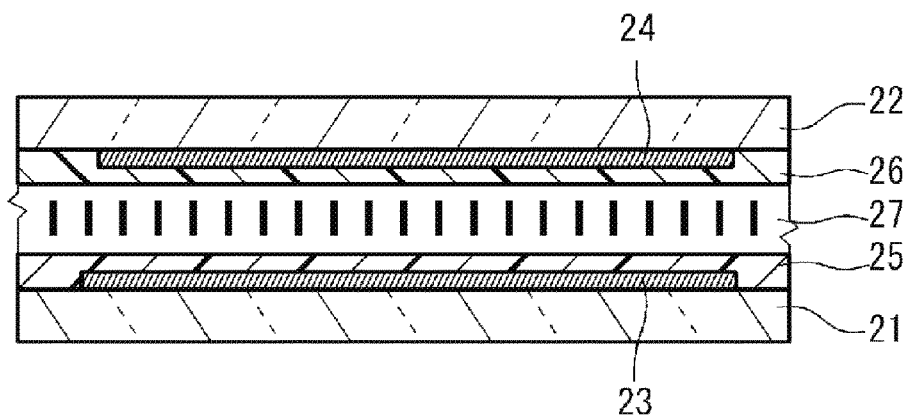
FIG. 2 is a schematic cross-sectional view showing the configuration of the liquid crystal element.

FIG. 2 is a schematic cross-sectional view showing the configuration of the liquid crystal element. The liquid crystal element 16 shown in the figure is configured to include a first substrate 21 and a second substrate 22 disposed facing each other, a first electrode 23 (a segment electrode) provided onto the first substrate 21, a second electrode 24 (a common electrode) provided onto the second substrate 22, and a liquid crystal layer 27 disposed between the first substrate 21 and the second substrate 22. The pair of polarizers 17a and 17b interposing the liquid crystal element 16 therebetween are disposed so that the respective absorption axes are substantially perpendicular to each other, for example. In the present embodiment, a normally black mode which is an operation mode where light is shielded when no voltage is applied to the liquid crystal layer 27 of the liquid crystal element 16 (transmittance becomes extremely low) is assumed.

Each of the first substrate 21 and the second substrate 22 is a rectangular substrate in plane view, disposed facing each other. A transparent substrate, such as a glass substrate, plastic substrate, or the like may be used for each substrate, for example. A plurality of spacers is dispersed uniformly and arranged between the first substrate 21 and the second substrate 22, for example, and as a result of these spacers, a predetermined gap (approximately a few μm, for example) is maintained between the two substrates.

The first electrode 23 is provided onto one surface side of the first substrate 21. The second electrode 24 is provided onto one surface side of the second substrate 22. Each electrode is configured, for example, by suitably patterning a transparent conductive film made of indium tin oxide (ITO) or the like. Although not shown in the figure, an insulating film may further be provided on the upper surface of each of the electrodes. Each region where the first electrode 23 and the second electrode 24 overlap functions as a light modulation region.

A first alignment film 25 is provided onto one surface side of the first substrate 21 so as to cover the first electrode 23. A second alignment film 26 is provided onto one surface side of the second substrate 22 so as to cover the second electrode 24. As for each of the alignment films, an alignment film which controls the aligned state of the liquid crystal layer 27 to a substantially vertically aligned state is used. On each of the alignment films, a uniaxial orientation process such as a rubbing process is performed thereby realizing alignment regulation force to one direction. The alignment treatment directions of the respective alignment films is set so that they become anti-parallel, for example.

A liquid crystal layer 27 is provided between the first substrate 21 and the second substrate 22. In this embodiment, the liquid crystal layer 27 is configured using a liquid crystal material having fluidity with negative dielectric constant anisotropy $\Delta\varepsilon$. In the liquid crystal layer 27 of this embodiment, the initial alignment state is determined by the alignment regulating force provided by the first alignment film 25 and the second alignment film 26. The liquid crystal layer 27 is set to have a pretilt angle of approximately 89° with respect to each of the substrate surfaces, for example. When a voltage equal to or higher than the threshold value is applied between the first electrode 23 and the second electrode 24, the liquid crystal molecules in the liquid crystal layer 27 tilt in a direction orthogonal to the substrate normal direction. Here, VA (vertical alignment) mode is assumed as the operation mode, but is not limited thereto and TN (twisted nematic) mode may also be provided.

Figure 3A:
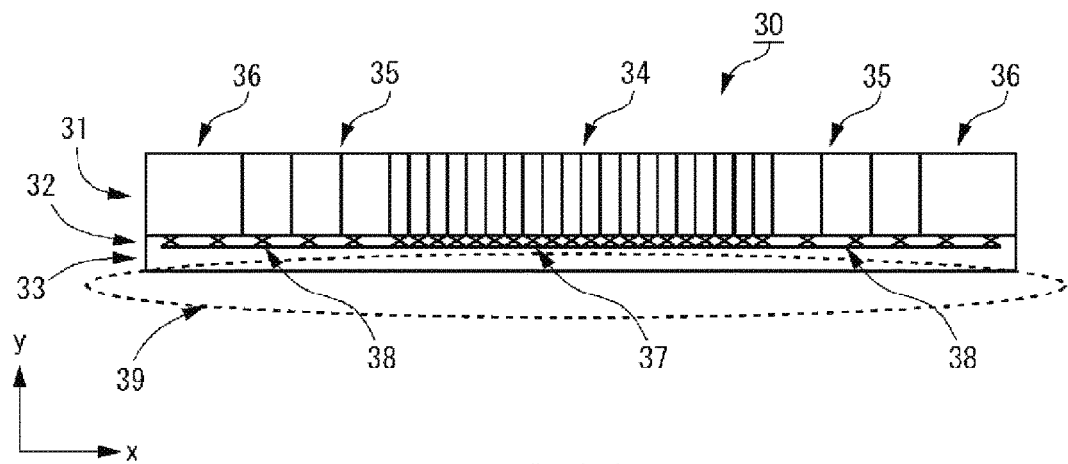
FIG. 3A is a figure for explaining the light distribution pattern.
Figure 3B:
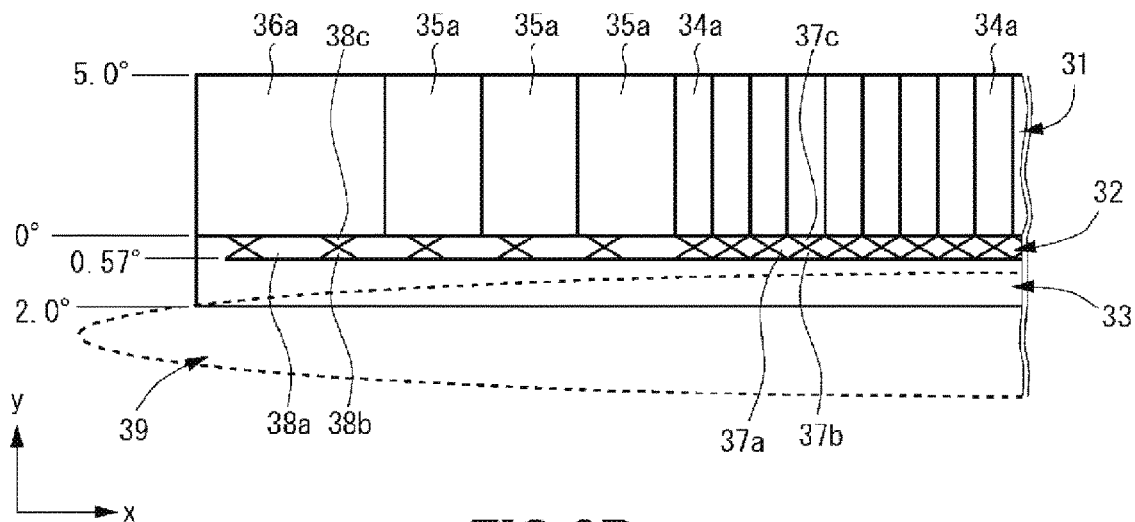
FIG. 3B shows the enlarged view of the left side portion of the light distribution pattern shown in FIG. 3A.
Figure 3C:
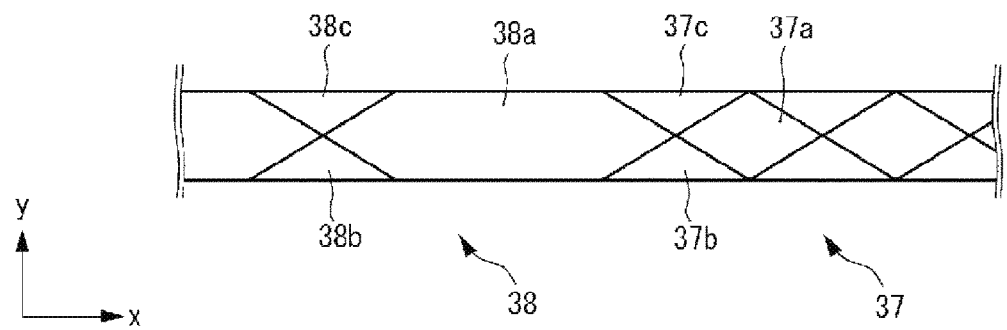
FIG. 3C further shows the enlarged view of the portion of the light distribution pattern shown in FIG. 3B.

FIG. 3A is a figure for explaining the light distribution pattern. The light distribution pattern 30 in this figure shows the pattern formed on the virtual screen at a predetermined position in front of its own vehicle (25 meters ahead of the vehicle, for example) by the vehicle headlamp system. Next, FIG. 3B shows the enlarged view of the left side portion of the light distribution pattern shown in FIG. 3A. FIG. 3C further shows the enlarged view of the portion of the light distribution pattern shown in FIG. 3B. In each of these figures, each of the regions partitioned into rectangular shapes, triangular shapes, and rhombic shapes is a region (hereinafter referred to as "light distribution region") in which light irradiation (and non-irradiation) can be individually controlled. In the figures, the y direction corresponds to the up-down direction (vertical direction) of the vehicle and the x direction corresponds to the left-right direction (horizontal direction) of the vehicle.

The light distribution pattern 30 is configured to include a first light distribution pattern 31, a second light distribution pattern 32, and a third light distribution pattern 33 in order from the upper side along the y direction in the figure. The first light distribution pattern 31, the second light distribution pattern 32, and the third light distribution pattern 33 each has a shape extending relatively long in the x direction in the figure, and in the example shown, they all have the same width (the length in the x direction) and they all have different heights (the length in the y direction). Further, the lower end of the first light distribution pattern 31 and the upper end of the second light distribution pattern 32, the lower end of the second light distribution pattern 32 and the upper end of the third light distribution pattern 33 are respectively in contact with each other.

The first light distribution pattern 31 includes each of light distribution patterns 34, 35, 36 arranged along the x direction. The light distribution pattern 34 is disposed substantially at the center in the x direction. A pair of the light distribution patterns 35 are disposed on both sides in the x direction of the light distribution pattern 34. A pair of the light distribution patterns 36 are disposed on the side in the x direction of each light distribution pattern 35. In the illustrated example, each of the light distribution patterns 34, 35, 36 has the same height (y direction length).

The light distribution pattern 34 has a plurality of light distribution regions 34a (20 in the illustrated example) each having a relatively small width (length in the x direction). Each of the light distribution regions 34a has the same width and the same height as one another and the regions are mutually arranged along the x direction without any gaps therebetween. Further, each region is formed in a rectangular shape long in the y direction. The light distribution pattern 34 realizes light distribution control in the vicinity of the center in front of its own vehicle by switching the irradiation (and non-irradiation) of light in each light distribution region 34a having a relatively small width. Since the width of each light distribution region 34a is relatively small, fine light distribution control with a high resolution can be achieved.

Each of the light distribution patterns 35 has a plurality of light distribution regions 35a (three each in the illustrated example) whose widths (length in the x direction) are relatively larger than each of the light distribution regions 34a of the light distribution pattern 34. Each of the light distribution regions 35a in the light distribution pattern 35 on the left side in the figure has the same width and the same height as each other and the regions are mutually arranged along the x direction without any gaps therebetween. Further, each region is formed in a rectangular shape long in the y direction. The same applies to each light distribution region 35a in the light distribution pattern 35 on the right side in the figure. Further, each of the light distribution patterns 35 is arranged without a gap such that the end portions arranged along the x direction (extending in the y direction) are in contact with the light distribution pattern 34. These light distribution patterns 35 realize light distribution control on the left and right sides in front of its own vehicle by switching the irradiation (and non-irradiation) of light in each light distribution region 35a having a relatively large width. Since a higher resolution is not required for the light distribution control on the left and right sides in front of its own vehicle, by arranging the width of each light distribution region 35a to be relatively large, the circuit configuration of the liquid crystal element drive circuit 18 can be simplified and the processing load of the light distribution control in the control device 11 can be reduced.

Each of the light distribution patterns 36 has a light distribution region 36a whose widths (length in the x direction) is relatively larger than each light distribution region 35a of the light distribution pattern 35. Each of the light distribution regions 36a has the same width and the same height as each other and each region is formed in a rectangular shape close to a square. Each of the light distribution patterns 36 is arranged without a gap so that the end portion arranged along the x direction (extending in the y direction) is in contact with the light distribution pattern 35. In the present embodiment, these light distribution patterns 36 are normally brought into a state in which no light is irradiated, but it is also possible to irradiate light as required.

The second light distribution pattern 32 is configured to include each of light distribution patterns 37, 38 arranged along the x direction. The light distribution pattern 37 is arranged at the center in the x direction. Each of the light distribution patterns 38 is disposed on both sides of the light distribution pattern 37 in the x direction. Each of the light distribution patterns 37, 38 in the illustrated example has the same height (length in the y direction).

The light distribution pattern 37 has a plurality of light distribution regions 37a, a plurality of light distribution regions 37b, and a plurality of light distribution regions 37c. Each of the light distribution regions 37a has the same width and height as one another and the regions are mutually arranged along the x direction without any gaps therebetween. Further, each region is formed in a rhombic shape. Each of the light distribution regions 37b has the same width and height as one another and the regions are mutually arranged along the x direction without any gaps therebetween. Further, each region is formed in a triangular shape in which one apex is directed upward. Each of the light distribution regions 37c has the same width and height as one another and the regions are mutually arranged along the x direction without any gaps therebetween. Further, each region is configured in an inverted triangular shape in which one apex is directed downward. Moreover, each of the light distribution regions 37b, 37c is set to have the same width as each of the light distribution regions 34a of the first light distribution pattern 31 and is arranged so as to be aligned in the up-down direction at the same arrangement interval along the x direction.

Each of the light distribution regions 37a is disposed such that apexes of adjacent light distribution regions 37a are in contact with each other, and all four sides of the regions are oblique to the x direction. Further, each light distribution region 37b and each light distribution region 37c are disposed one above the other such that one light distribution region 37b and one light distribution region 37c form a pair and one apex of each region are in contact with each other. Further, each light distribution region 37b is disposed such that the apexes of adjacent light distribution regions 37b are in contact with each other and the respective base sides of the regions are parallel to the x direction. Similarly, each light distribution region 37c is disposed such that the apexes of adjacent light distribution regions 37c are in contact with each other and the respective base sides of the regions are parallel to the x direction. And each of the light distribution regions 37a, the light distribution regions 37b, the light distribution regions 37c are arranged alternately along the x direction in such a manner that one light distribution region 37a is sandwiched between the adjacent pairs of light distribution regions 37b, 37c arranged one above the other.

Each of the light distribution patterns 38 has a plurality of light distribution regions 38a, a plurality of light distribution regions 38b, and a plurality of light distribution regions 38c. Each of the light distribution regions 38a has the same width and height as one another and the regions are mutually arranged along the x direction without any gaps therebetween. Further, each of the light distribution regions 38a has a hexagonal shape. Each of the light distribution regions 38b has the same width and height as one another and the regions are arranged along the x direction. Each light distribution region 38b is formed in a triangular shape with one apex directed upward. Each of the light distribution regions 38c has the same width and height as one another and the regions are arranged along the x direction. Each light distribution region 38c is formed in an inverted triangular shape with one apex directed downward.

Each of the light distribution regions 38a is disposed such that the apexes of adjacent light distribution regions 38a are in contact with each other, each upper side and lower side of the regions are parallel to the x direction, and the other four sides of the regions are all oblique to the x direction. Further, each light distribution region 38b and each light distribution region 38c are disposed one above the other such that one light distribution region 38b and one light distribution region 38c form a pair and one apex of each region are in contact with each other. Further, each of the light distribution regions 38b is disposed such that the respective base sides of the regions are parallel to the x direction. Similarly, each of the light distribution regions 37c is disposed such that the respective base sides of the regions are parallel to the x direction. Moreover, each of the light distribution regions 38a, the light distribution regions 38b, the light distribution regions 38c is arranged alternately along the x direction in such a manner that one light distribution region 38a is sandwiched between the adjacent pairs of light distribution regions 38b, 38c arranged one above the other.

As shown in FIG. 3C, in the light distribution pattern 37, each of the rhombic light distribution regions 37a is arranged so that each of the four sides is oblique to the x direction, and each oblique angle is set to 22.5°. Similarly, in the light distribution pattern 38, each of the hexagonal light distribution regions 38a is arranged so that each of the four sides other than the upper side and lower side of the region is oblique to the x direction, and each oblique angle is set to 22.5°. Similarly, each of the light distribution regions 37b, 37c disposed one above the other is arranged so that the two sides other than the base side thereof are oblique to the x direction and the respective oblique angles are set to 22.5°. The same applies to each of the light distribution regions 38b, 38c, and the respective oblique angles are set to 22.5°. Further, each of the light distribution regions 38a is set to be wider than each of the rhombic light distribution regions 37a and set to have the same height. On the other hand, each of the light distribution regions 38b, 38c is set to have the same width and height as each of the light distribution regions 37b, 37c.

According to such light distribution patterns 37 and 38, it is possible to variably set the position of the cutoff line in the horizontal direction by controlling the light irradiation (and non-irradiation) of each light distribution region, and to variably set the direction (right upward/left upward) of the cutoff line. Further, since the light distribution pattern 37 is configured to include each light distribution region 37a having a relatively small width, it is possible to control the position of the cutoff line in the vicinity of the center in front of its own vehicle with a high resolution.

In the present embodiment, the third light distribution pattern 33 is composed of one light distribution region extending in the x direction. The third light distribution pattern 33 is arranged so as to overlap with the upper end side of the low beam light distribution pattern 39 formed by a low beam unit which is not shown in the figure. That is, the third light distribution pattern 33 functions as a margin region for combining the low beam light distribution pattern 39 and the light distribution pattern 30 without generating any gap therebetween.

Referring again to FIG. 3B, pitch angles in the up-down direction (vertical direction) and the left-right direction (horizontal direction) of the light distribution pattern 30 will be exemplified. When the reference position in the horizontal direction is defined as 0°, the first light distribution pattern 31 is formed in the range of the reference position 0° to +5.0° in the upward direction, for example. Further, the second light distribution pattern 32 is formed in the range of the reference position 0° to −0.57° in the downward direction, for example. And the third light distribution pattern 33 is formed in the range of −0.57° to −2.0° in the downward direction, for example. Further, when the reference position in the vertical direction is defined as 0°, the light distribution pattern 34 of the first light distribution pattern 31 is arranged within the range of ±10° and each of the light distribution regions 34a of the light distribution pattern 34 is arranged at a pitch (resolution) of 1°. Further, the light distribution pattern 35 on the left side of the first light distribution pattern 31 is arranged within the range of −10° and −22.5° and the light distribution pattern 35 on the right side of the first light distribution pattern 31 is arranged within the range of +10° and +22.5°. Each of the light distribution regions 35a of each light distribution pattern 35 is arranged at a pitch (resolution) of 2.5°.

Next, the configuration of the electrode of the liquid crystal element 16 for achieving the above-stated light distribution pattern will be described in detail with reference to FIG. 4A to FIG. 9. Each of FIGS. 4A to 9 is a plan view from the second substrate 22 side shown in FIG. 2.

Figure 4A:
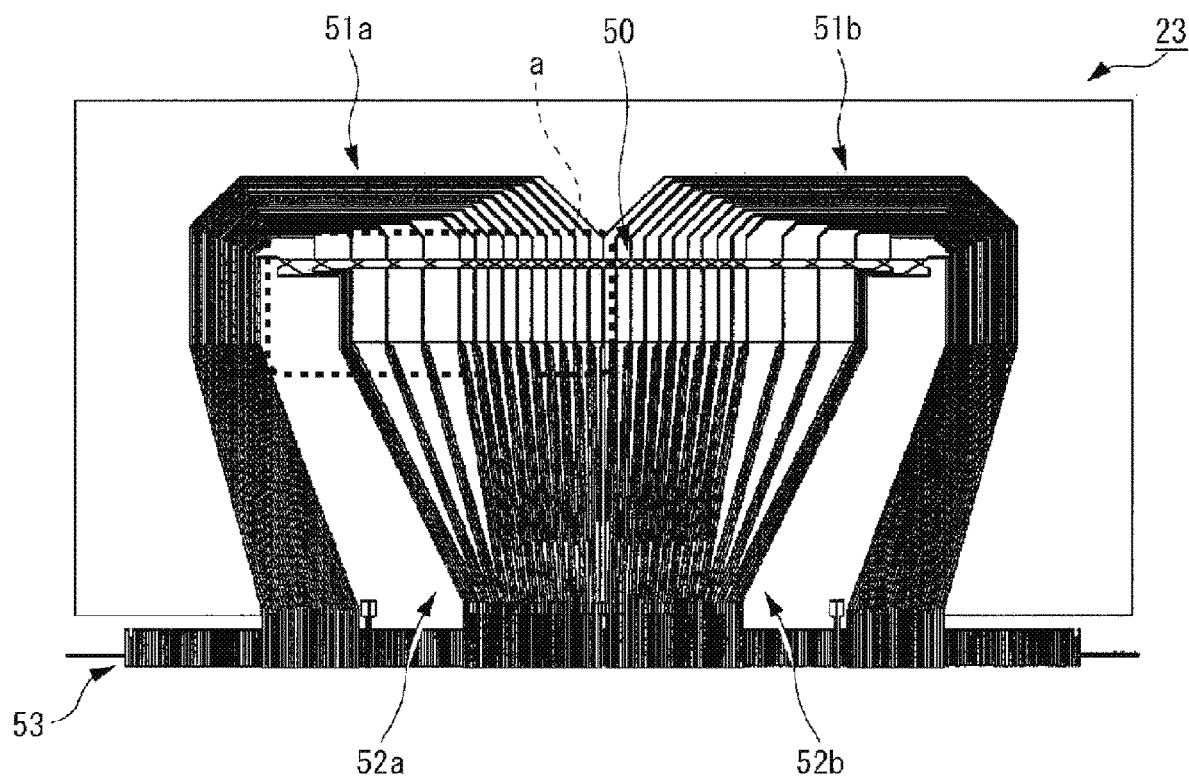
FIG. 4A is a plan view showing the configuration of the first electrode (segment electrode) of the liquid crystal element.

FIG. 4A is a plan view showing the configuration of the first electrode (segment electrode) of the liquid crystal element. The first electrode 23 shown in the figure is configured to include a segment electrode pattern part 50 having an electrode shape corresponding to the shape of each light distribution region of the light distribution patterns, two lead wiring parts (two second lead wiring parts) 51*a*, 51*b* connected to the segment electrode pattern part 50 on the upper side in the figure, two lead wiring parts (two first lead wiring parts) 52*a*, 52*b* connected to the segment electrode pattern part 50 on the lower side in the figure, and a terminal part 53 which is arranged on the lower side of the segment electrode pattern part 50 in the figure and is connected to the lead wiring parts 51*a*, 51*b*, 52*a*, and 52*b*. In the present embodiment, each of the individual electrode parts included in the segment electrode pattern part 50 is connected to the liquid crystal driving device 18 via one of the lead wirings included in the lead wiring parts 51*a*, 51*b*, 52*a*, 52*b*, and is capable of supplying voltage by using the static driving method.

Each of the lead wiring parts Ma, 51*b* is provided bilaterally symmetrically. As illustrated in the figure, the lead wiring part 51*a* is connected to the end of the upper left side of the segment electrode pattern part 50, is routed from the upper side to the left side of the segment electrode pattern part 50, and is further routed to the lower side of the segment electrode pattern part 50 to reach the terminal part 53. Similarly, as illustrated in the figure, the lead wiring part 51*b* is connected to the end of the upper right side of the segment electrode pattern part 50, is routed from the upper side to the right side of the segment electrode pattern part 50, and is further routed to the lower side of the segment electrode pattern part 50 to reach the terminal part 53.

Each of the lead wiring parts 52*a*, 52*b* is provided bilaterally symmetrically. As illustrated in the figure, the lead wiring part 52*a* is connected to the end of the lower left side of the segment electrode pattern part 50 and is routed to the lower side of the segment electrode pattern part 50 to reach the terminal part 53. Similarly, as illustrated in the figure, the lead wiring part 52*b* is connected to the end of the lower right side of the segment electrode pattern part 50 and is routed to the lower side of the segment electrode pattern part 50 to reach the terminal part 53.

Figure 4B:
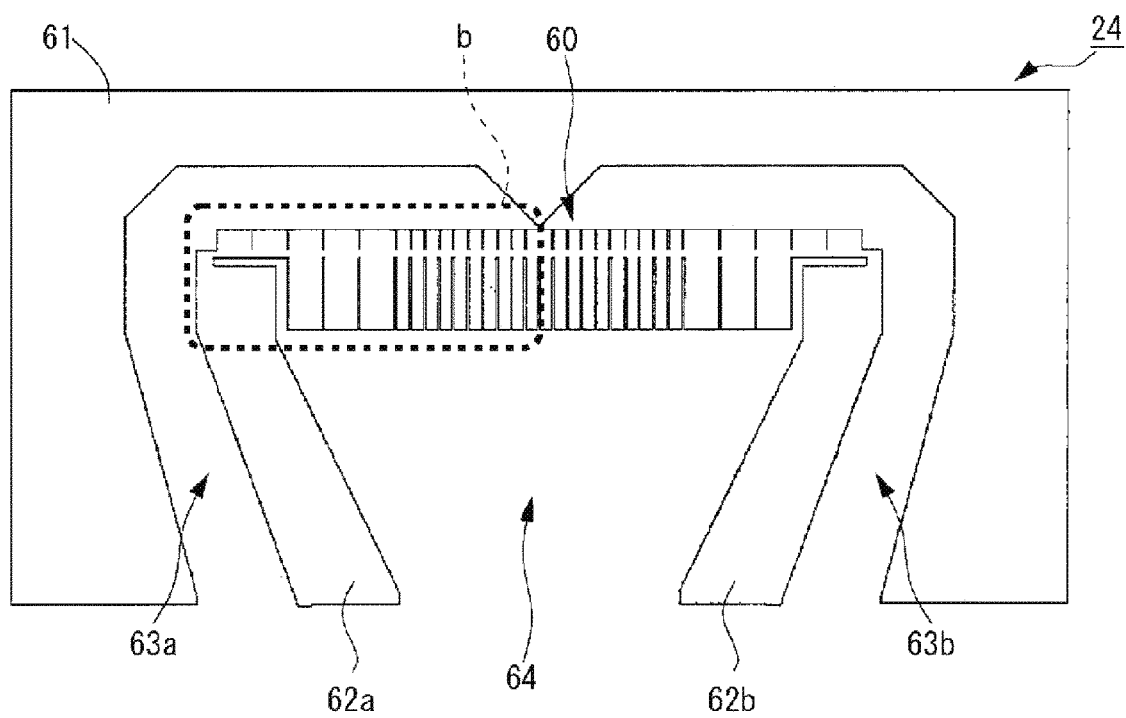
FIG. 4B is a plan view showing the configuration of the second electrode (common electrode) of the liquid crystal element.

FIG. 4B is a plan view showing the configuration of the second electrode (common electrode) of the liquid crystal element. As illustrated in the figure, the second electrode 24 has a shape corresponding to the plan view shape of the above-described segment electrode pattern part 50 and is configured to include a common electrode pattern part 60 disposed to overlap with the segment electrode pattern part 50, a dummy electrode pattern part 61 disposed on the left and right from above the common electrode pattern part 60, a lead wiring part 62*a* connected to the left end portion of the common electrode pattern part 60 and provided so as to be routed downwardly, and a lead wiring part 62*b* connected to the right end portion of the common electrode pattern part 60 and provided so as to be routed downwardly. Each of the lead wiring parts 62*a*, 62*b* is connected to the terminal part 53 of the first electrode 23 via a conductive material at a predetermined position on the lower end side thereof. By providing each of the lead wiring parts 62*a*, 62*b* on the left and right side of the common electrode pattern part 60 in this way, it is possible to reduce voltage unevenness (potential gradient) in the left and the right direction of the common electrode pattern part 60.

Further, as illustrated in the figure, the second electrode 24 has an opening part 63*a* extending from the upper left side to the left side of the common electrode pattern part 60 and to the lower side thereof, an opening part 63*b* extending from the upper right side to the right side of the common electrode pattern part 60 and to the lower side thereof, and an opening part 64 provided on the lower side of the common electrode pattern part 60. The opening part 63*a* is disposed so as to overlap with the lead wiring part 51*a* of the segment electrode 23. The opening part 63*b* is disposed so as to overlap with the lead wiring part 51*b* of the segment electrode 23. The opening part 64 is disposed so as to overlap with the lead wiring parts 52*a*, 52*b* of the segment electrode 23. That is, by having these opening parts 63*a*, 63*b*, 64, the second electrode 24 can be disposed to overlap with the segment electrode pattern part 50 without overlapping with the respective lead wiring parts of the first electrode 23.

Figure 5:
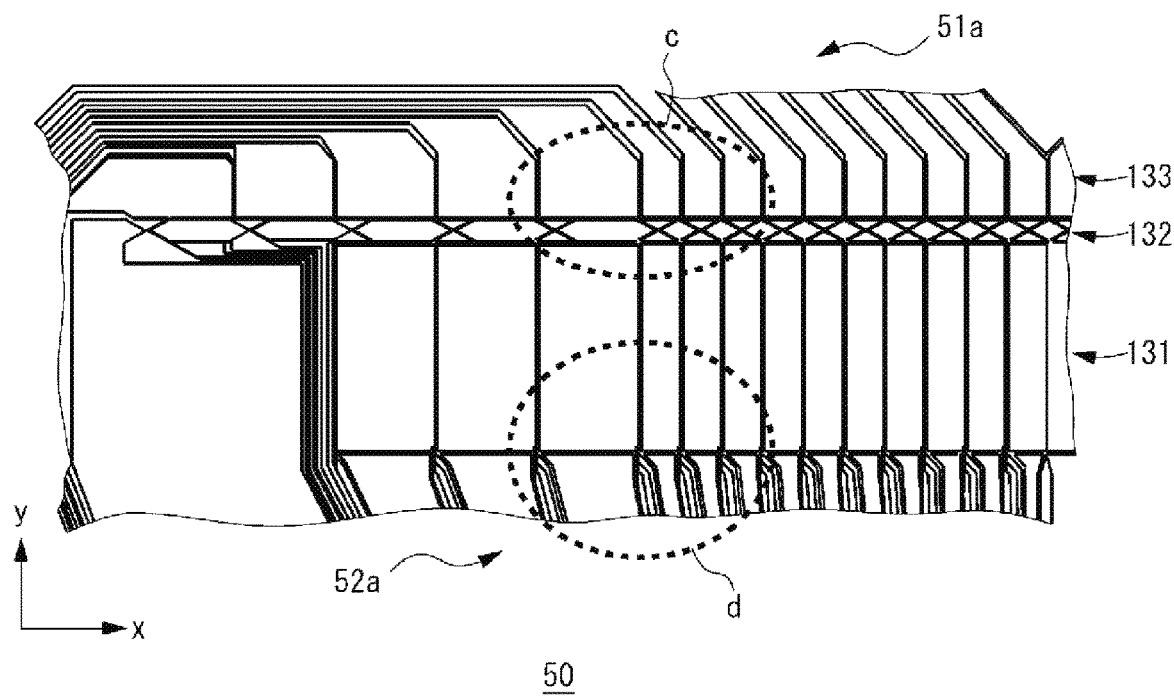
FIG. 5 is a plan view showing the enlarged view of the area marked as "a" surrounded by the dotted line in FIG. 4A which shows the segment electrode pattern part.
Figure 6:
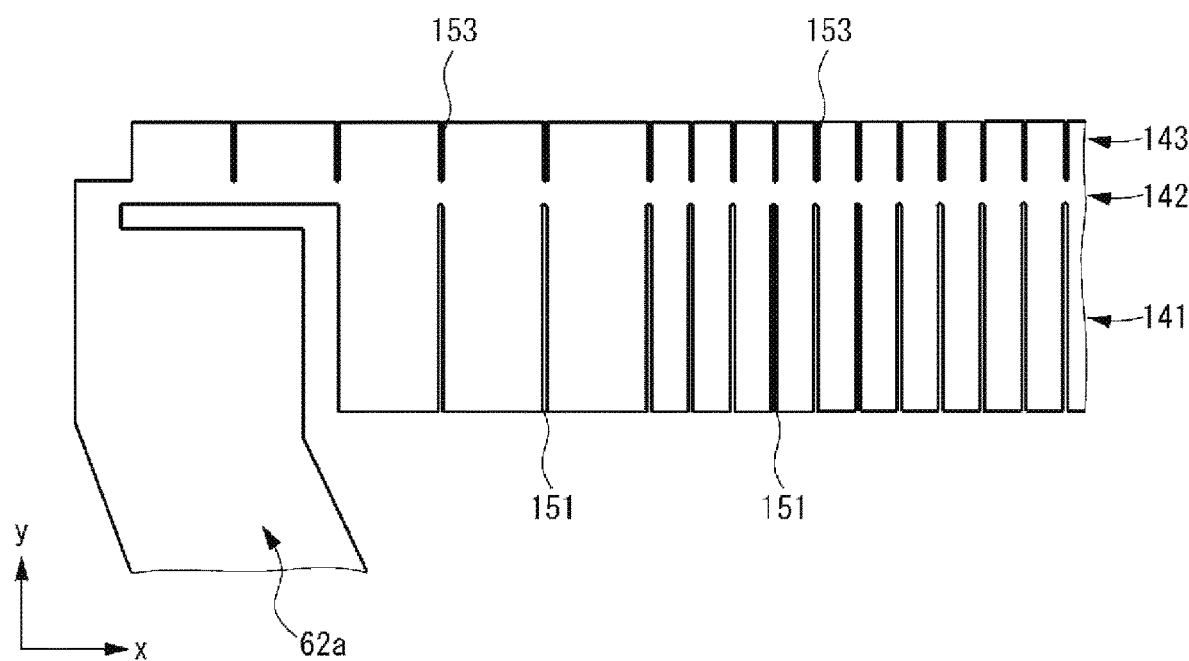
FIG. 6 is a plan view showing the enlarged view of the area marked as "b" surrounded by the dotted line in FIG. 4B which shows the common electrode pattern part.
Figure 7:
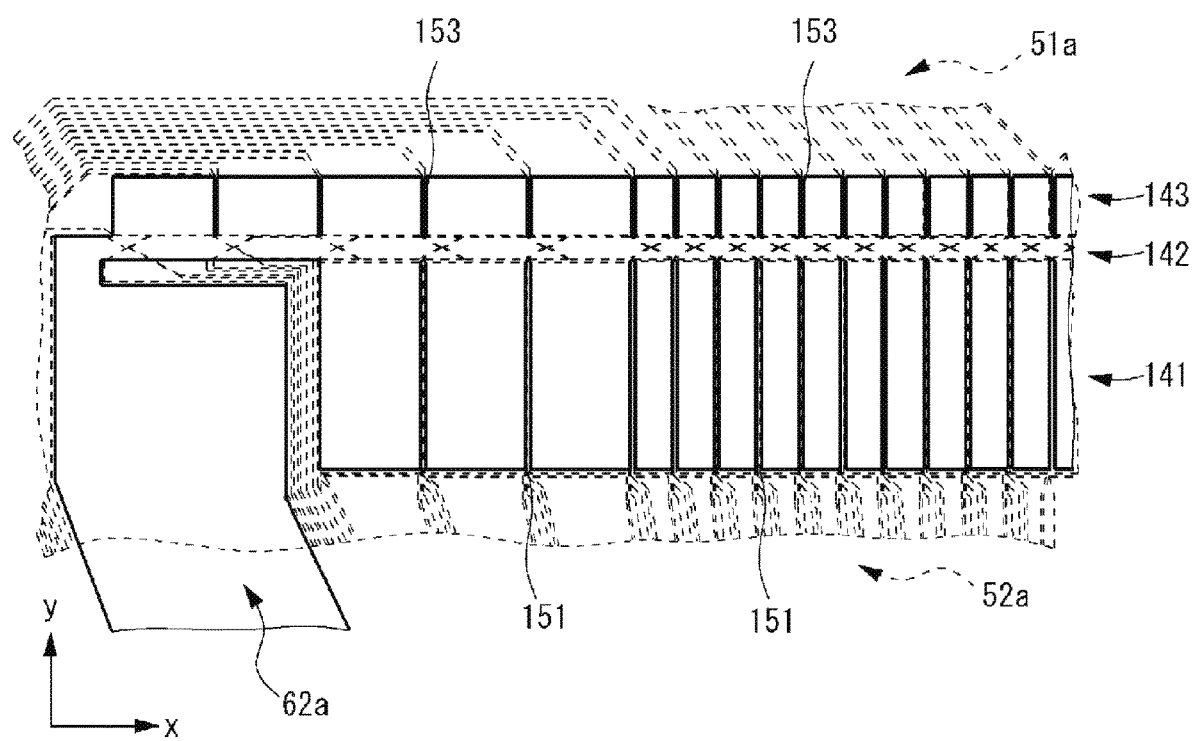
FIG. 7 is a plan view showing a state where a segment electrode pattern part and a common electrode pattern part are superimposed and viewed from the common electrode pattern part side.

FIG. 5 is a plan view showing the enlarged view of the area marked as "a" surrounded by the dotted line in FIG. 4A which shows the segment electrode pattern part. FIG. 6 is a plan view showing the enlarged view of the area marked as "b" surrounded by the dotted line in FIG. 4B which shows the common electrode pattern part. FIG. 7 is a plan view showing a state where a segment electrode pattern part and a common electrode pattern part are superimposed and viewed from the common electrode pattern part side.

As shown in FIG. 5, the segment electrode pattern part 50 has a first electrode pattern part 131, a second electrode pattern part 132, and a third electrode pattern part 133 in order from the lower side in the figure. The first electrode pattern part 131 corresponds to the above-described first light distribution pattern 31, and has a plurality of rectangular individual electrode parts arranged along the x direction in the figure. Similarly, the second electrode pattern part 132 corresponds to the above-described second light distribution pattern 32, and has a plurality of hexagonal shaped, rhombic shaped, triangular shaped, and inverted triangular shaped individual electrode parts arranged along the x direction in the figure. Similarly, the third electrode pattern part 133 corresponds to the above-described third light distribution pattern 33, and has a plurality of rectangular individual electrode parts arranged along the x direction in the figure. Each of the individual electrode parts of the first electrode pattern part 131, the second electrode pattern part 132, and the third electrode pattern part 133 is connected to either the lead wiring part 51*a* or the lead wiring part 52*a*, respectively. Here, as described above, the segment electrode pattern part 50 is configured bilaterally symmetrically and has the same structure on the right side portion as the left side portion shown in FIG. 5. (Refer to FIG. 4A.)

As shown in FIG. 6, the common electrode pattern part 60 has a first electrode pattern part 141, a second electrode pattern part 142, and a third electrode pattern part 143 in order from the lower side in the figure. The first electrode pattern part 141 is disposed so as to overlap with the first electrode pattern part 131 of the segment electrode pattern part 50 in plan view. The second electrode pattern part 142 is disposed so as to overlap with the second electrode pattern part 132 of the segment electrode pattern part 50 in plan view. The third electrode pattern part 143 is disposed so as to overlap with the third electrode pattern part 133 of the segment electrode pattern part 50 in plan view. Here, as described above, the common electrode pattern part 60 is formed bilaterally symmetrically, and the same structure is also provided on the right side portion as the left side portion shown in FIG. 6. (Refer to FIG. 4B.)

As shown in FIG. 6 and FIG. 7, the first electrode pattern part 141 has a plurality of slit parts 151 intermittently arranged along the x direction. These slit parts 151 are disposed so as to overlap with the wiring regions of the individual lead wirings disposed between the individual electrodes of the segment electrode pattern part 50 and prevent voltage from being applied to the liquid crystal layer 27 by each lead wiring. Similarly, the third electrode pattern part 143 has a plurality of slit parts 153 intermittently arranged along the x direction. These slit parts 153 are disposed so as to overlap with the wiring regions of the individual lead wirings disposed between the individual electrodes of the segment electrode pattern part 50 and prevent voltage from being applied to the liquid crystal layer 27 by each lead wiring. On the other hand, the second electrode pattern part 142 is provided so as to extend in the x direction without having any slit part. The second electrode pattern part 142 functions as a crossover wiring part for electrically connecting the electrode portions separated by the respective slit parts 151, 153 of the common electrode pattern part 60.

Figure 8:
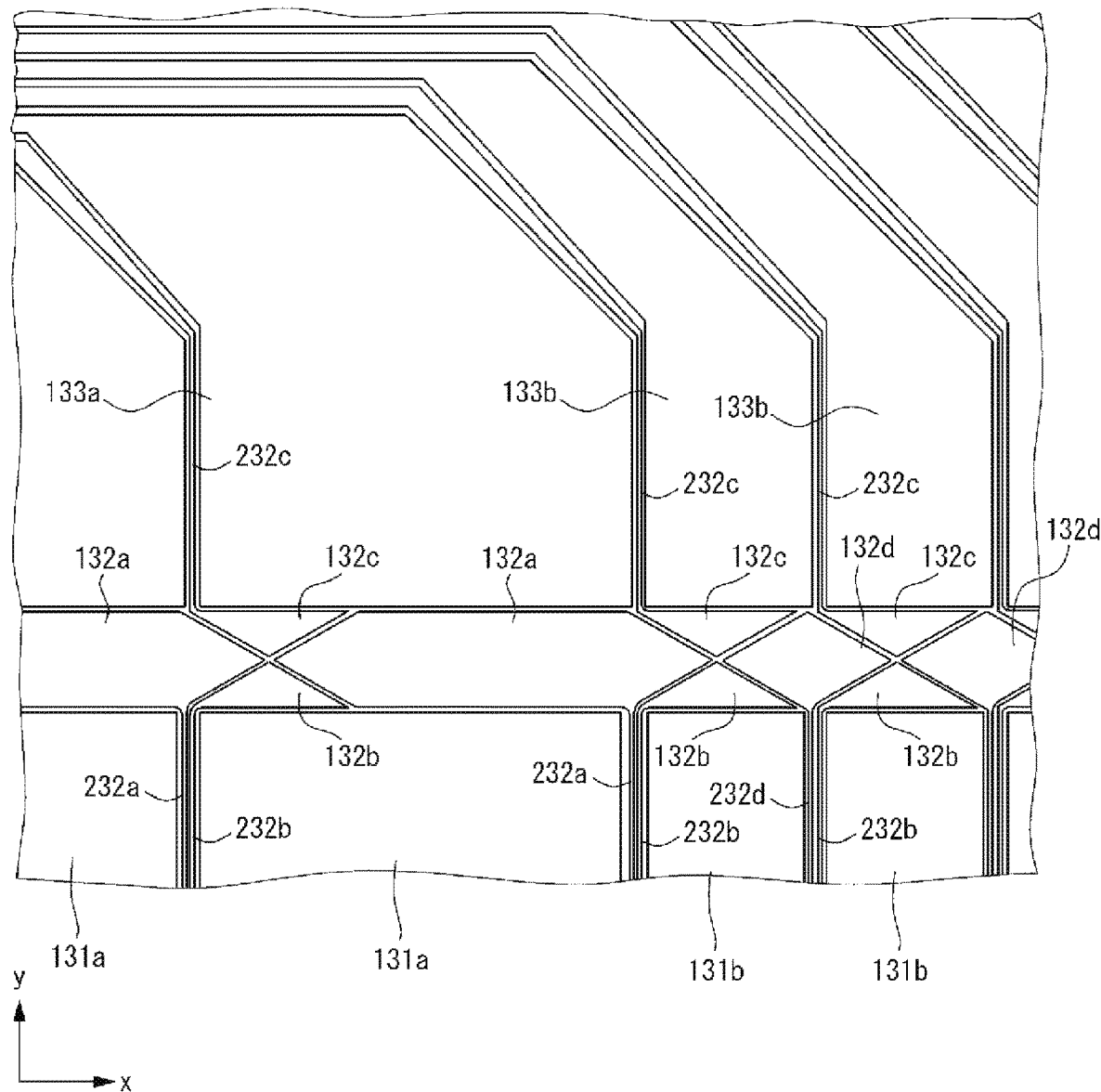
FIG. 8 is a plan view showing the enlarged view of the area marked as "c" surrounded by the dotted line in FIG. 5 which shows the segment electrode pattern part.

FIG. 8 is a plan view showing the enlarged view of the area marked as "c" surrounded by the dotted line in FIG. 5 which shows the segment electrode pattern part. As illustrated in the figure, the second electrode pattern part 132 of the segment electrode pattern part 50 includes a hexagonal shaped individual electrode part 132a (a second individual electrode part), a triangular shaped individual electrode part 132b (a second individual electrode part), an inverted triangular shaped individual electrode part 132c (a second individual electrode part), and a diamond shaped individual electrode part 132d (a second individual electrode part). The shape of the individual electrode part 132a is similar to the shape of the light distribution region 38a of the above-described second light distribution pattern 32. Similarly, the shape of the individual electrode part 132b is similar to the shape of the light distribution regions 37c, 38c of the above-described second light distribution pattern 32, and the shape of the individual electrode part 132c is similar to the shape of the light distribution regions 37b, 38b. The shape of the individual electrode part 132d is similar to the shape of the light distribution region 37a of the above-described second light distribution pattern 32.

Each individual electrode 132a is connected with an individual lead wiring 232a. Each individual lead wiring 232a is connected at one apex of each individual electrode 132a and extends to the lower side in the figure. Further, each individual lead wiring 232a is disposed between two adjacent ones of the individual electrodes 131a, 131b. Likewise, each individual electrode 132b is connected with an individual lead wiring 232b. Each individual lead wiring 232b is connected at one apex of each individual electrode 132b and extends to the lower side in the figure. Further, each individual lead wiring 232b is disposed between two adjacent ones of the individual electrodes 131a, 131b. Likewise, each individual electrode 132d is connected with an individual lead wiring 232d. Each individual lead wiring 232d is connected at one apex of each individual electrode 132d and extends to the lower side in the figure. In the present embodiment, either the two individual lead wirings 232a and 232b (the second individual lead wirings) or the two individual lead wirings 232b and t232d (the second individual lead wirings) are disposed between two adjacent ones of the individual electrodes 131a, 131b (the first individual electrode parts). On the other hand, each individual electrode 132c is connected with an individual lead wiring 232c (the first individual lead wiring). Each individual lead wiring 232c is connected at one apex of each individual electrode 132c and extends to the upper side in the figure. Further, each individual lead wiring 232c is disposed between two adjacent ones of the individual electrodes 133a, 133b.

Figure 9:
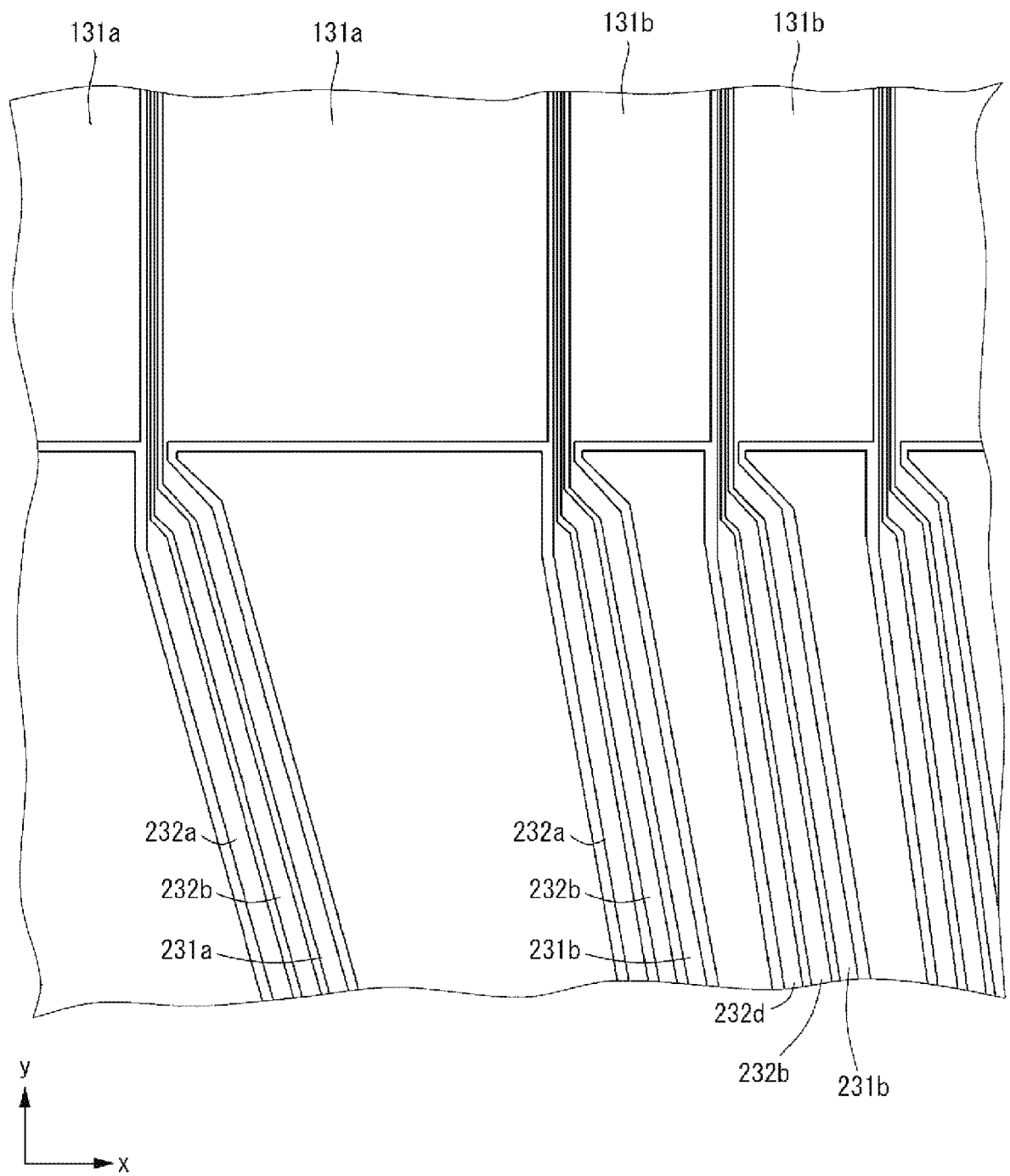
FIG. 9 is a plan view showing the enlarged view of the area marked as "d" surrounded by the dotted line in FIG. 5 which shows the segment electrode pattern part.

FIG. 9 is a plan view showing the enlarged view of the area marked as "d" surrounded by the dotted line in FIG. 5 which shows the segment electrode pattern part. As described above, either the two lead wirings 232a and 232b or the two lead wirings 232b and 232d are disposed between two adjacent ones of the individual electrodes 131a, 131b, and these lead wirings 232a, 232b, etc. further extend downward in the figure. Further, the lead wirings 231a, 231b are connected to the individual electrodes 131a, 131b, respectively. The lead wiring 231a extends to the lower side in the figure together with the lead wirings 232a, 232b. Similarly, the lead wiring 231b extends to the lower side in the drawing together with the lead wirings 232a, 232b. Furthermore, in the present embodiment, a dummy electrode is provided between these lead wirings 231a, etc.

By disposing the lead wirings as described above, as shown in the figure, for every one of the individual electrodes 132a, 132b, 132c, 132d of the second electrode pattern part 142, these lead wirings extend in either the upward or the downward direction, and it becomes unnecessary to mutually connect the lead wirings among the individual electrodes 132a, 132b, 132c, and 132d. As a result, since the gap between the individual electrodes 132a, 132b, 132c, 132d can be made narrower (5 μm to 20 μm for example), luminance non-uniformity due to the dark line caused by the gap can be reduced. On the other hand, a relatively wide gap (25 μm to 100 μm for example) is generated by disposing the lead wirings between the individual electrodes of the first electrode pattern part 141 and the third electrode pattern part 133. However, since the dark line generated by this gap is in the up-and-down direction (the vertical direction), it is easy to make the dark line inconspicuous by using optical components such as an image shifter, etc., for example.

According to the embodiment as described above, in the case of selectively irradiating the periphery of the vehicle using the liquid crystal element, it is possible to facilitate the lead wiring layout corresponding to an increase in the number of the individual electrodes of the liquid crystal element.

It should be noted that this invention is not limited to the subject matter of the foregoing embodiment, and can be implemented by being variously modified within the scope of the present invention as defined by the appended claims. For example, in the above-described embodiment, the light distribution region in each light distribution pattern has basically been explained by an either-or choice of light irradiation or light non-irradiation, but it is also possible to increase or decrease the applied voltage to the a liquid crystal layer so that the brightness at the time of light irradiation can be variably set. For example, when the position of the cutoff line is moved while traveling on a curved road or the like, by setting the brightness of the light distribution region to be variable, it is possible to realize a smoother light distribution change thereby reducing possible discomfort to the driver.

Further, in the above embodiment, a vertical alignment type liquid crystal element is cited as an example of a liquid crystal element, but the operation mode of the liquid crystal element is not limited thereto. In addition, the number of the light distribution regions included in each light distribution pattern in the above embodiment may be increased to enhance the resolution of the light distribution control. Since a liquid crystal element is used, there is an advantage of little cost increase even if the number of light distribution regions is increased in such a way.

Further, in the above-described embodiment, the second light distribution pattern is assumed to be a light distribution region for variably setting the cutoff line in the horizontal direction, but the second light distribution pattern may be configured to be the same as the first light distribution pattern which includes a plurality of rectangular light distribution regions, and arrange the plan view shape of each individual electrode correspondingly. In this case, a finer light distribution control can be realized by combining the first light distribution pattern and the second light distribution pattern. The same applies to the third light distribution pattern.

What is claimed is:

1. A vehicle headlamp system that selectively performs light irradiation towards a periphery of its own vehicle, the vehicle headlamp system comprising:
    a light source,
    a liquid crystal element arranged at a position where light from the light source enters, and
    a lens for projecting an image formed by the light emitted from the liquid crystal element to the periphery of its own vehicle,
    wherein the liquid crystal element comprises:
        a first substrate and a second substrate arranged to face each other,
        a liquid crystal layer disposed between the first substrate and the second substrate,
        a first electrode and a first lead wiring part provided on the first substrate, and
        a second electrode disposed on the second substrate and arranged to face the first electrode,
    wherein the first electrode comprises:
        a first electrode pattern part having a plurality of first individual electrode parts arrayed along a first direction in plan view, and
        a second electrode pattern part having a plurality of second individual electrode parts arrayed along the first direction in plan view, the second electrode pattern part being disposed adjacent to the first electrode pattern part in a second direction which is substantially orthogonal to the first direction,
    wherein the first lead wiring part comprises:
        a plurality of first individual lead wirings each of which is connected to one of the plurality of first individual electrode parts, and
        a plurality of second individual lead wirings each of which is connected to one of the plurality of second individual electrode parts and arranged through a gap formed between two adjacent ones of the first individual electrode parts in the first direction,
    wherein the second electrode comprises:
        a plurality of slit parts which extend in the second direction and are intermittently arranged along the first direction, and
        a crossover wiring part which extends along the first direction and connects electrode portions separated by the plurality of slit parts,
    wherein each of the plurality of slit parts is arranged so as to overlap with at least one of the plurality of second individual lead wirings in plan view, and
    wherein the crossover wiring part is disposed so as to overlap with the plurality of second individual electrode parts in plan view.

2. The vehicle headlamp system according to claim 1, wherein the plurality of second individual electrode parts comprises a plurality of rhombic shaped and/or hexagonal shaped individual electrode parts and a plurality of triangular shaped individual electrode parts and/or a plurality of inverted triangular individual electrode parts, and
    wherein each of the second individual electrode parts is arranged such that at least one side thereof intersects the first direction.

3. The vehicle headlamp system according to claim 2, wherein each of the plurality of triangular shaped individual electrode parts is arranged adjacent to a respective one of the plurality of inverted triangular shaped individual electrode parts in the second direction, so as to form a pair.

4. The vehicle headlamp system according to claim 1, wherein each of the plurality of triangular shaped individual electrode parts and/or the plurality of inverted triangular shaped individual electrode parts and each of the plurality of rhomboid shaped and/or hexagonal shaped individual electrode parts are alternately arranged in the first direction.

5. The vehicle headlamp system according to claim 2, wherein each of the plurality of triangular shaped individual electrode parts and/or the plurality of inverted triangular shaped individual electrode parts and each of the plurality of rhomboid shaped and/or hexagonal shaped individual electrode parts are alternately arranged in the first direction.

6. The vehicle headlamp system according to claim 3, wherein each of the plurality of triangular shaped individual electrode parts and/or the plurality of inverted triangular shaped individual electrode parts and each of the plurality of rhomboid shaped and/or hexagonal shaped individual electrode parts are alternately arranged in the first direction.

7. The vehicle headlamp system according to claim 1, further comprising:
    a photographing device for photographing a front of the own vehicle, and
    a computer system for determining a predetermined non-irradiation area and an irradiation area using information photographed by the photographing device.

8. The vehicle headlamp system according to claim 7, wherein the computer system controls driving of the liquid crystal element according to the non-irradiation area and the irradiation area.

9. The vehicle headlamp system according to claim 2, wherein each side of each of the plurality of rhombic shaped individual electrode parts is oblique to the first direction.

10. The vehicle headlamp system according to claim 9, further comprising:
    a photographing device for photographing a front of the own vehicle, and
    a computer system for determining a predetermined non-irradiation area and an irradiation area using information photographed by the photograph device.

* * * * *